May 23, 1944.  E. A. KEELER  2,349,436

TEMPERATURE MEASURING DEVICE

Filed March 31, 1938

INVENTOR.
EARL A. KEELER
BY George H. Mumelauff
ATTORNEY.

Patented May 23, 1944

2,349,436

UNITED STATES PATENT OFFICE 2,349,436

TEMPERATURE MEASURING DEVICE

Earl A. Keeler, Norristown, Pa., assignor to The Brown Instrument Company, Philadelphia, Pa., a corporation of Pennsylvania Application March 31, 1938, Serial No. 199,121

14 Claims. (Cl. 73—355)

This invention relates to pyrometers and more particularly to that type in which the radiant heat of a body is measured without subjecting the pyrometer structure to the actual temperature to be measured.

A general object of the invention is to provide measuring and/or controlling apparatus of the type referred to above which is characterized by its simplicity and effectiveness, and may be operated directly from a commercial source of alternating current.

A further and more specific object of the invention is to provide an instrument of the type referred to above in which an element responsive to the radiant energy emanating from a hot body whose temperature is to be measured biases a device towards and away from a predetermined position responsively to changes in said radiant energy, and a measure of the temperature of said hot body is had by ascertaining the force necessary to restore and maintain said device in said predetermined position.

The various features of novelty which characterize my invention are pointed out with particularity in the claims annexed to and forming a part of this specification. For a better understanding of the invention, however, its advantages and specific objects attained with its use, reference should be had to the accompanying drawing and descriptive matter in which I have illustrated and described a preferred embodiment of the invention.

Figure 1:
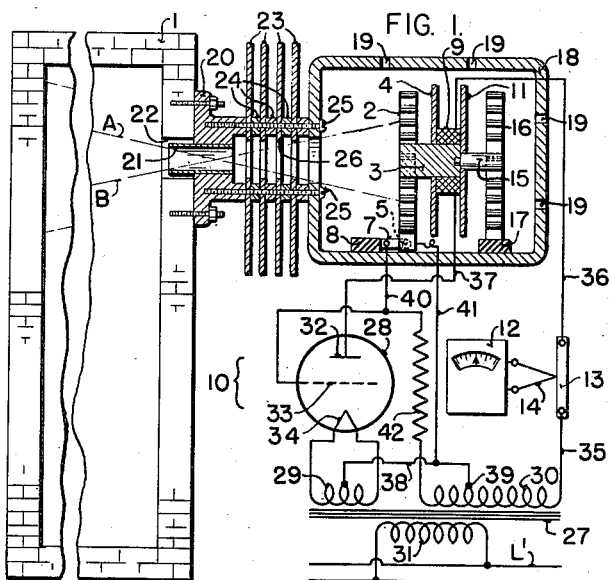
Fig. 1 is a more or less diagrammatical view illustrating one embodiment of the invention.
Figure 2:
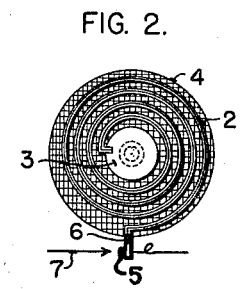
Fig. 2 illustrates in detail the radiation responsive element of Fig. 1.

The embodiment of my invention illustrated in Figs. 1 and 2 of the drawing comprises an instrument for measuring and exhibiting the temperature of a furnace 1 responsively to the winding or unwinding of a spiral thermostatic device 2, to be described, which is exposed to the radiant energy emanating from the interior of said furnace. The device 2 is composed of two metals having different temperature coefficients of expansion which are welded, riveted, or soldered together along their entire length. Such devices are commonly known as bimetallic elements and have the property of warping when subjected to the influence of heat. As illustrated in detail in Fig. 2, the device 2 is preferably formed into a spiral which unwinds when its temperature is raised. It will be clear the spiral may be so composed as to wind up tighter when its temperature is raised, but for clarity and definiteness of illustration, the device 2 has been shown as unwinding when its temperature is raised.

The device 2 is preferably minute so that it is capable of being well covered by the image of a body of moderate dimensions, and is coated with a substance such as lamp black or its equivalent which absorbs radiation falling on it. It has its inner extremity soldered to a shaft 3 of metal such as silver or copper having a high heat conductivity. Shaft 3 also carries a plate 4 adjacent the device 2 which is preferably blackened on the side nearest the device 2 and is brightly polished on its other side. The radiation which penetrates between the turns of the spiral 2 is thus received by the plate 4 which imparts by conductivity to the spiral 2.

The spiral device 2 carries a contact 5 at its outer and free end which may desirably be insulated therefrom by an insulating part 6. Contact 5 is positioned in cooperative relation with a stationary contact 7 mounted on an insulating block 8 and is adapted to move into and out of engagement with contact 7 accordingly as the temperature of the device 2 becomes greater or less than a predetermined value responsively to changs in the radiant energy impinging thereon. In referring to a temperature of device 2 of "predetermined value," I contemplate a value which is automatically and continuously reset and is desirably reset through the action of the measuring apparatus itself. For example, on a change in the temperature of the interior of furnace 1 and a consequent change in the radiant energy impinging on the device 2, the latter winds or unwinds to bias the contact 5 into or out of engagement with the stationary contact 7, and as a result of such engagement or disengagement, the temperature of the device 2 is varied in one direction or the other by means under control of said contacts, and described hereinafter, to thereby effect the return of said device to a normal positional relation with respect to the stationary contact 7.

The positional relation that normally exists between the device 2 and contact 7 is such that the contacts 5 and 7 are in chattering engagement so that normally the periods during which the device 2 is successively actuated for movement in opposite directions are so brief that the device 2 is given no movement of significant extent. Upon the occurrence of a change in the radiant energy impinging on the device 2, however, the engagement or disengagement of the contacts 5 and 7 is sustained for a longer period whereby the device 2 will be actuated in the proper direction to restore the normal positional relation between the device 2 and contact 7.

The means referred to above for varying the temperature of the device 2, and thereby actuating the latter for movement in a direction to restore the contacts 5 and 7 into chattering engagement, includes a heating coil 9 and an associated electronic amplifier 10. Heating coil 9 is carried by the shaft 3 and is positioned between the plate 4 and a second plate 11 carried by the shaft 3 at a point remote from the device 2. The plate 11 is preferably brightly polished on both sides. Energizing current is supplied the heating coil 9 from the output circuit of the amplifier 10, the current flow through which is adapted to be controlled by the contacts 5 and 7, which as shown, are connected to the amplifier input circuit. When contacts 5 and 7 are in engagement, amplifier 10 is adapted to supply a predetermined value of current to heating coil 9, but when the contacts are out of engagement, the current supplied coil 9 is materially reduced and may even assume a zero value. Spiral device 2 is so arranged that when coil 9 is energized it unwinds and separates the contacts 5 and 7, and conversely when the heating coil is energized to a lesser extent, the device 2 is permitted to cool and winds up to move the contact 5 into engagement with the contact 7.

It will thus be noted the device 2 is adapted to be heated by the radiation impinging thereon or transmitted thereto by the plate 4, and by the heat transmitted thereto from the heating coil 9. As will be clearly apparent, the average current value over a given period of time through heating coil 9 which is required to maintain the device 2 in a position such that the contacts 5 and 7 will be in chattering engagement will vary in accordance with the radiant energy impinging on the device 2 from the furnace 1 and thereby on the temperature of the interior of the furnace, and in this form of my invention I obtain a measure of that temperature by measuring the average current value supplied heating coil 9 by means of a meter 12. As illustrated, the current to be measured by the meter 12 is passed through a resistor element 13 and the heat generated in the resistor element generates a voltage in a thermocouple 14, the terminals of which are connected to the meter 12, which actuates the meter and causes deflection of its deflecting element to an extent determined by the magnitude of the current passing through the resistance element 13. Meter 12 may be a thermocouple ammeter, as shown, or may be a hot wire or other suitable type, and is preferably calibrated in terms of temperature to thereby provide a direct indication of the temperature of the interior of the furnace 1. It will be apparent the conductors connecting the terminals of the meter 12 to the amplifier 10 may be extended to any desired length thereby permitting the indication of the temperature of the interior of the furnace 1 at a point remote from the latter.

In instruments employing bimetallic elements it will be apparent that changes in the ambient temperature of the atmosphere about the device 2 will cause winding or unwinding of the latter independently of either the radiant energy impinging thereon or transmitted thereto from the plate 4, and in order to compensate for such changes in ambient temperature, the shaft 3 is connected by an extension 15, which is preferably of smaller diameter than the shaft 3 and also of lower heat conductivity, to the inner end of a spiral bimetallic device 16. The outer end of the spiral device 16 is connected to an insulating block 17 which is secured in any convenient manner to a casing 18 which houses the radiant energy responsive device 2 and the associated apparatus described. The device 16 is preferably composed of the same metals which make up the device 2, but is so wound and composed as to wind and unwind respectively in opposition to the unwinding and winding of the spiral device 2 upon ambient temperature changes, the device 16 being substantially unaffected by the heater winding 9. Changes in ambient temperature, thus, will have no effect on the accuracy of the instrument.

The casing 18 is ventilated by means of openings 19 therein and is carried by a support 20 which is secured to the outer wall or shell of the furnace 1. The support 20 has a central aperture in which is rigidly secured a tube 21 which is adapted to extend into a port or opening 22 in the furnace wall to any desired depth.

In order to limit the radiant energy impinging on the device 2 to that portion of the furnace wall included between the dotted diagonal lines A—B, a stack of plates or shields 23, held apart by means of spacing washers 24, are provided between the furnace 1 and the housing 18. As illustrated, the housing 18 is rigidly secured to the support 20 by means of fastening bolts 25 which pass through the wall of housing 18 adjacent the furnace 1, plates 23, and the spacing washers 24.

As will be apparent, the amount of radiant energy impinging on the spiral device 2 depends upon the temperature of the interior wall of the furnace, but this amount may be adjusted as desired by varying the diameter of the aligned openings 26 in the plates 23, the diameter of the opening in the housing 18 and the diameter of opening in tube 21. The parts which limit the included angle between the dotted diagonal lines A—B constitute a shield for the device 2 since they shield the latter from undesirable radiation from hot portions of the furnace not within the selected area. The outer surface of tube 21 is preferably polished so that it will absorb a minimum of radiant energy impinging on it. In addition, the transfer of heat energy from tube 21 to the device 2 by conduction is prevented by the plates 23 which are in direct metallic contact with the tube 21 and carry off any heat transferred to them either by radiation or conduction.

As illustrated, the amplifier 10 includes a transformer 27 and an electronic valve 28. The transformer 27 supplies power to the system and is a combination step-up and step-down transformer comprising a low voltage secondary winding 29, a high voltage secondary winding 30, and a line voltage primary winding 31 having its terminals connected to alternating current supply conductors $L^1$ and $L^2$.

The electronic valve 28 is shown as a triode type and includes an anode 32, a control grid 33, and a filament cathode 34. The low voltage transformer secondary winding 29 is connected to the filament cathode 34 and supplies energizing current thereto. Anode voltage is supplied valve 28 from the high voltage secondary winding 30 through a circuit which may be traced from the right hand terminal of the winding to a conductor 35, through the resistance element 13, to a conductor 36, the heating coil 9 and therethrough to a conductor 37, the anode 32 and cathode 34 of valve 28, and a conductor 38 to a tap 39 on the transformer secondary winding.

As noted hereinbefore, the means for controlling the conductivity of valve 28, and thereby the energization of the heating coil 9, includes the contact 5 carried by the device 2 and the stationary contact 7. Contact 7 is connected by a conductor 40 to the control grid 33 of valve 28 and contact 5 is connected by conductors 41 and 38 to a center tap on the low voltage transformer winding 29 and thereby to the cathode 34. When the contacts 5 and 7 are out of engagement, a potential of such polarity is impressed on the control grid 33 by a portion of the secondary winding 30 through a resistance 42 that the grid potential relative to the cathode potential is such that the conductivity of the valve is a minimum. The circuit so employed for biasing the control grid 33 may be traced from the left hand terminal of the transformer secondary winding 30 to the resistor 42 and therethrough to the control grid 33.

When the contact members 5 and 7 are in engagement, however, it will be noted the bias voltage provided by the secondary winding 30 is shunted out and the potential of the control grid 33 will then be raised to that of the cathode 34 and may even be swung slightly positive with respect to the cathode potential, and as a result, the current conducted by the valve will be materially increased.

It is noted that since an alternating current voltage is impressed on the anode circuit of valve 28 that the current conducted thereby will be pulsating. In this arrangement, therefore, in order to provide a measure of the temperature of the interior of the furnace 1 in terms of the current supplied heating coil 9, a meter capable of indicating average values of current flows, such as meter 12 previously described, must be employed.

Figure 3:
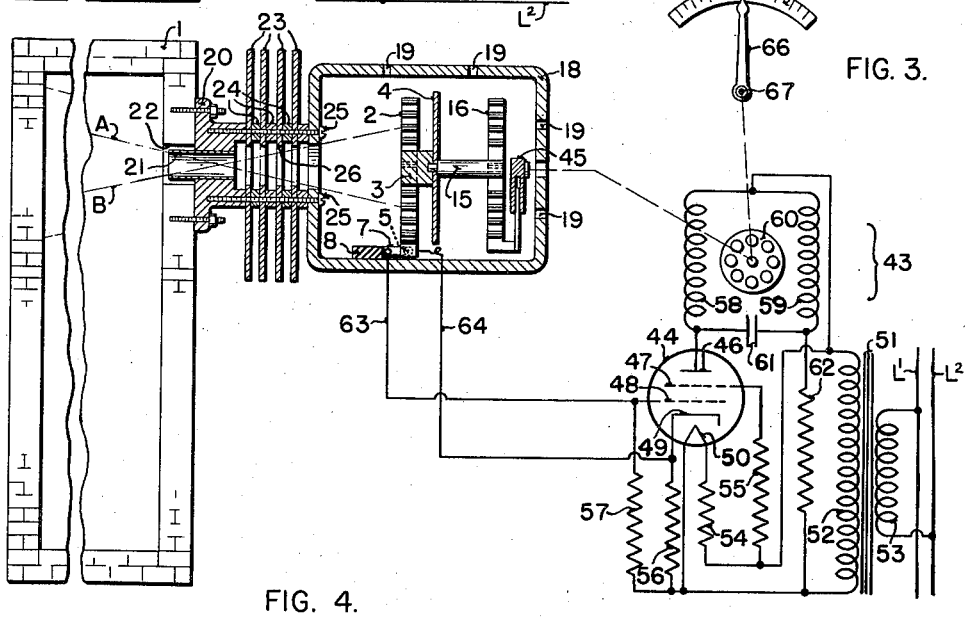
Fig. 3 illustrates a modification of the arrangement of Fig. 1.

In Fig. 3 I have illustrated, more or less diagrammatically, a modification of the Fig. 1 arrangement in which the heating coil 9 and meter 12 may be dispensed with and in which the contact 5 is restored to a position of chattering engagement, on departure therefrom as a result of a change in the radiant energy impinging on the device 2, by a reversible electrical motor 43. In accordance with this modified arrangement the reversible motor 43 is selectively controlled for rotation in one direction or the other by an electronic valve 44 which, in turn, is controlled by the contacts 5 and 7. In accordance with this modification the outer end of the spiral ambient temperature compensating device 16 is connected by means of a crank 45 to the shaft of motor 43 so that as the motor 43 is selectively actuated for rotation in one direction or the other, the shaft 15 connected to the inner end of the device 16 will be rotated accordingly thereby imparting rotation to the device 2 and movement of the contact 5 into chattering engagement with the contact 7. The crank 45 may desirably be of the telescoping type, as shown, thereby permitting radial movement of the outer end of device 16.

It is noted motor 43 may be mounted in any convenient manner to the housing 18 either on the inside or outside thereof, as desired.

Valve 44 is a heater type tetrode preferably of the type known commercially as beam power amplifier valves, for example, a 25L6 type valve, and includes an anode 46, a screen grid 47, a control grid 48, a cathode 49 and a heater filament 50. Energizing voltage is supplied the valve 44 from a transformer 51 which, as shown, includes a secondary winding 52 and a primary winding 53 having its terminals connected to the supply conductors $L^1$ and $L^2$. Energizing current is supplied the filament 50 from the transformer secondary winding 52 through a circuit which may be traced from the lower terminal of the secondary winding to the filament, and a resistor 54 to the upper terminal of the winding. Resistor 54 is employed for limiting the flow of current to the filament 50 and is so chosen that the voltage impressed on the filament will be the desired value. Screen grid 47 is connected to the upper terminal of transformer secondary winding 52 through a resistance 55 of suitable value, and cathode 49 is connected to the lower terminal of the secondary winding through a biasing resistor 56. Control grid 48 is connected to the negative end of resistor 56 through a resistor 57.

Reversible motor 43 is of the well known capacitor induction variety having field windings 58 and 59 spaced in quadrature with each other, and so disposed relatively to a squirrel cage rotor 60 that half of each winding is at diametrically opposite sides of the rotor, and also includes a condenser 61 of suitable capacity. In the normal operation of such motors the magnetic fields set up in the rotor by the windings 58 and 59 have a phase displacement of not more than 90° whereby the fields form together a rotating field such as to cause rotation of the rotor in one direction or the other accordingly as the field set up by the winding 58 is displaced in the forward or the backward direction relatively to the field set up by the winding 59.

Winding 58 is connected in a series circuit with the anode to cathode resistance of valve 44 and the cathode biasing resistor 56 across the transformer secondary winding 52, and winding 59 is connected in a series circuit with a fixed resistor 62 thereacross. Condenser 61 is connected between the anode 46 of valve 44 and the point of connection of resistor 62 and the winding 59. Thus, when the anode to cathode resistance of valve 44 is approximately equal to the resistance of resistor 62, the impedance of the circuit paths including the windings 58 and 59 will be approximately equal so that the terminals of condenser 61 will be at the same potential. As a result the magnetic fields set up by the windings 58 and 59 will be approximately in phase and consequently the rotor 60 will remain stationary. When the anode to cathode resistance of valve 44 is increased or decreased, however, the terminals of condenser 61 will be at different potentials so that in effect the condenser will be connected in a series circuit with one motor winding 58 or 59 in shunt to the other motor winding, and as a result the magnetic field set up by one motor winding will be displaced in the forward or backward direction with respect to the magnetic field set up by the other winding and the rotor 60 will be actuated for rotation in a corresponding direction.

As noted hereinbefore, the means for controlling the conductivity of valve 44 includes the contacts 5 and 7, and as shown the contact 7 is connected by a conductor 63 to the control grid 48 and the contact 5 is connected by a conductor 64 to the positive end of the cathode biasing resistor 56. Thus, on a change in the radiant energy impinging on the device 2, for example, on a decrease thereof, the contact 5 will be moved into engagement with contact 7 to thereby shunt out the negative bias voltage impressed on the control grid 48 by the resistor 56, and accordingly the conductivity of valve 44 is increased. It is noted that when the term conductivity is used in connection with the valve 44 the effective conductivity as regards the tendency for energizing the motor 43 for rotation is intended. Since an alternating voltage is impressed on the anode circuit of valve 44, the latter will conduct pulsating current and as the amplitude of the pulsating current rises above a predetermined value determined by the magnitude of the resistor 62, the rotor 60 of motor 43 will be urged to rotation in one direction or the other and in the case above mentioned, will cause rotation of crank 45 in a clockwise direction to thereby move contact 5 out of engagement with contact 7.

When contact 5 is out of engagement with contact 7, negative charges will be permitted to accumulate on the control grid 48 and a decrease in conductivity of valve 44 will result whereupon motor 43 will be energized for rotation in the opposite direction. Contact 5 will then again move into engagement with contact 7 and motor 43 will be energized for rotation in the opposite direction. As will be clearly apparent, the system will quickly come to an equilibrium condition in which the contacts 5 and 7 are in chattering engagement and motor 43 will then be actuated for rotation in opposite directions in rapid alternation and will remain stationary. Upon an increase or decrease in the radiant energy impinging on the device 2, however, engagement or disengagement of contacts 5 and 7 will be sustained for a substantial interval and accordingly motor 43 will be actuated for rotation in one direction or the other and will cause movement of the crank 45 and thereby device 2 in the proper direction to reestablish a chattering engagement between the contacts 5 and 7.

In this arrangement means are provided in the form of a suitably calibrated scale 65 and an associated pointer 66 carried by a shaft 67 connected through suitable gearing, not shown, to the motor rotor 60 for indicating the temperature of the interior of the furnace 1.

Figure 4:
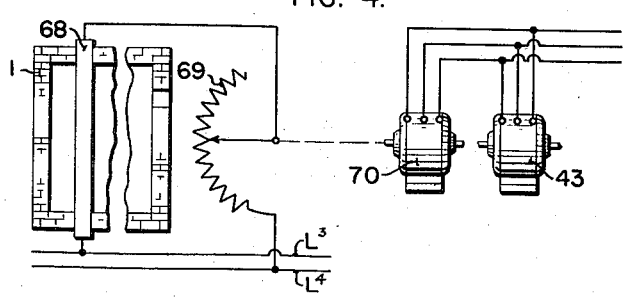
Fig. 4 is a diagrammatic representation of the use of the invention in a control system.

It will be apparent that the apparatus of my present invention may be employed to operate a control valve, rheostat, or the like for governing the application of an agent to the furnace 1 for producing heat and to the radiant energy of which the device 2 is responsive. For example, the supply of heat producing agent to the furnace 1 may be automatically governed by means responsive to the deflection of the deflecting element of the meter 12 of the Fig. 1 arrangement, or may be governed either by the motor 43 of the Fig. 3 arrangement or by a motor 70 connected in parallel with the motor 43, as shown in Fig. 4. As illustrated in Fig. 4, a furnace 1, to the radiant energy of which the device 2 is responsive, is heated by a resistor 68 which is connected to electric supply conductors $L^3$ and $L^4$ through a rheostat 69, the adjustment of which is effected by the motor 70 which may be exactly like motor 43. The mechanical connection of rheostat 69 to the motor 70 is such as to increase and decrease the supply of electric current to the resistor 68 as the temperature of the interior of furnace 1 drops below or rises above a predetermined level.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. Measuring apparatus including a device deformable in accordance with changes in the temperature thereof, means for focussing radiation from a hot body whose temperature is to be measured on said device whereby the form of said device changes with variations in the temperature of said hot body, means mechanically connected to said device to control said device as required to neutralize the effects of ambient temperature variations on the form thereof, and means under control of said device to restore said device to a predetermined form on departure therefrom.

2. Measuring apparatus including a device deformable in accordance with changes in the temperature thereof, means for focussing radiation from a hot body whose temperature is to be measured on said device whereby the form of said device changes with variations in the temperature of said hot body, means mechanically connected to said device to control said device as required to neutralize the effects of ambient temperature variations on the form thereof, means under control of said device to restore said device to a predetermined form on departure therefrom, and exhibiting means controlled by said last mentioned means.

3. Measuring apparatus including a device deformable in accordance with changes in the temperature thereof, means for focussing radiation from a hot body whose temperature is to be measured on said device whereby the temperature of said device will vary in accordance with changes in the temperature of said hot body, means mechanically connected to said device to control said device as required to neutralize the effects of ambient temperature variations on the form thereof, a supporting member for said device, means associated with said supporting member and responsive to deformation of said device for reducing such deformation, and registering means controlled by said last mentioned means.

4. Measuring apparatus including a device formed of metals having different temperature coefficients of expansion and supported at one end and carrying a contact at its other end, a relatively fixed contact associated with said first mentioned contact and adapted to be engaged thereby, means for focussing radiation from a hot body whose temperature is to be measured on said device, means mechanically connected to said device to control said device as required to neutralize the effects of ambient temperature variations on the form thereof, means independent of said hot body producing a control effect on said device opposing that produced by said radiation, said last mentioned means including means under control of said contacts, and means for exhibiting the magnitude of said control effect.

5. Measuring apparatus including a device formed of metals having different temperature coefficients of expansion, a contact controlled by said device, a relatively fixed contact associated with said first mentioned contact and adapted to be engaged thereby, means for focussing radiation from a hot body whose temperature is to be measured on said device, means mechanically connected to said device and operative to vary the position of said device as required to neutralize the effects of ambient temperature variations on the relative positions of said contacts, means independent of said hot body producing a control effect on said device opposing that produced by said radiation, said last mentioned means including means under control of said contacts, and means for exhibiting the magnitude of said control effect.

6. Measuring apparatus including a device deformable in accordance with changes in the temperature thereof, a contact controlled by said device, a relatively fixed contact associated with said first mentioned contact and normally in chattering engagement therewith, means for focussing radiation from a hot body whose temperature is to be measured on said device, means mechanically connected to said device to control said device as required to neutralize the effects of ambient temperature variations on the form thereof, auxiliary heating means associated with said device, and means under control of said contacts for controlling said auxiliary heating means.

7. Measuring apparatus including a device deformable in accordance with changes in the temperature thereof, a contact carried by said device, a relatively fixed contact associated with said first mentioned contact and normally in chattering engagement therewith, means for focussing radiation from a hot body whose temperature is to be measured on said device, means mechanically connected to said device to control said device as required to neutralize the effects of ambient temperature variations on the form thereof, auxiliary heating means associated with said device, and means under control of said contacts for controlling said auxiliary heating means.

8. Measuring apparatus including a device deformable in accordance with changes in the temperature thereof, a contact carried by said device, a relatively fixed contact associated with said first mentioned contact and adapted to be engaged thereby, means for heating said device including means for focussing radiation thereon from a hot body whose temperature is to be measured and auxiliary heating means, means mechanically connected to said device to control said device as required to neutralize the effects of ambient temperature variations on the form thereof, registering means, and means under control of said contacts for controlling said auxiliary heating means and said registering means.

9. Measuring apparatus including a device formed of metals having different temperature coefficients of expansion and supported at one end and carrying a contact at its other end, a relatively fixed contact associated with said first mentioned contact and normally in chattering engagement therewith, means for focussing radiation from a hot body whose temperature is to be measured on said device, means associated with said device and operative on movement of said device from the position in which said contacts are in chattering engagement to return said device to that position, means mechanically connected to said device and operative to vary the position of said device as required to neutralize the effects of ambient temperature variations on the relative positions of said contacts, exhibiting means, and means under control of said contacts controlling said exhibiting means and said second mentioned means.

10. Measuring apparatus including a device deformable in accordance with changes in the temperature thereof, a contact controlled by said device, a relatively fixed contact associated with said first mentioned contact and adapted to be engaged thereby, means for focussing radiation from a hot body whose temperature is to be measured on said device whereby the form of said device changes with variations in the temperature of said hot body, means mechanically connected to said device to control said device as required to neutralize the effects of ambient temperature variations on the form thereof and means including electronic valve means under control of said contacts to restore said device to a predetermined form on departure therefrom.

11. Measuring apparatus including a device formed of metals having different temperature coefficients of expansion and supported at one end and carrying a contact at its other end, a relatively fixed contact associated with said first mentioned contact and adapted to be engaged thereby, means for focussing radiation from a hot body whose temperature is to be measured on said device, means mechanically connected to said device and operative to vary the position of said device as required to neutralize the effects of ambient temperature variations on the relative positions of said contacts, means independent of said hot body adapted to exert a controlling action on said device, registering means, and electronic valve means having a connection with and under control of said contacts to control said independent means and said registering means.

12. Measuring apparatus utilizing for the measurement of temperature the heating effect of radiation emitted by a hot body including a device formed of metals having different coefficients of expansion and supported at one end and carrying a contact at its free end, a relatively fixed contact associated with said first mentioned contact and adapted to be engaged thereby, means for focussing the rays of radiant energy on said device, means mechanically connected to said device and operative to vary the position of said device as required to neutralize the effects of ambient temperature variations on the relative positions of said contacts, means for heating said device independently of said hot body, registering means, and electronic valve means under control of said contacts adapted to control said heating means and said registering means.

13. Measuring apparatus including a device deformable in accordance with changes in the temperature thereof, means for focussing radiation from a hot body whose temperature is to be measured on said device whereby the temperature of said device will vary in accordance with changes in the temperature of said hot body, a supporting member for said device, means responsive to deformation of said device, means physically associated with said supporting member and controlled by said responsive means to produce a follow-up action which neutralizes the effect of deformation of said device on said responsive means, registering means controlled by said responsive means, and compensating means mechanically connected to said device to physically vary the position of said device as required to neutralize the effect on said responsive means of deformation of said device caused by the variations in ambient temperature.

14. Measuring apparatus including a supporting member, a device formed of metals having different temperature coefficients of expansion and supported at one end by said supporting member and carrying a contact at its other end, a relatively fixed contact associated with said first mentioned contact and normally in chattering engagement therewith, means for focussing radiation from a hot body whose temperature is to be measured on said device, means associated with said device and operative on movement of said device from the position in which said contacts are in chattering engagement to return said device to that position, means mechanically interposed between said supporting member and said device and operative to vary the position of said device as required to neutralize the effects of ambient temperature variations on the relative positions of said contacts, exhibiting means, and means under control of said contacts controlling said exhibiting means and said second mentioned means.

EARL A. KEELER.